US007493335B2

(12) United States Patent
Gold et al.

(10) Patent No.: US 7,493,335 B2
(45) Date of Patent: Feb. 17, 2009

(54) OBJECT PROCESS GRAPH RELATIONAL DATABASE INTERFACE

(75) Inventors: Steven Allen Gold, Madison, CT (US); David Marvin Baker, Branford, CT (US)

(73) Assignee: Graphlogic Inc., Branford, CT (US)

( * ) Notice: Subject to any disclaimer, the term of this patent is extended or adjusted under 35 U.S.C. 154(b) by 0 days.

(21) Appl. No.: 10/908,652

(22) Filed: May 20, 2005

(65) Prior Publication Data

US 2006/0004851 A1    Jan. 5, 2006

Related U.S. Application Data

(60) Provisional application No. 60/585,257, filed on Jul. 2, 2004.

(51) Int. Cl.
*G06F 7/00* (2006.01)

(52) U.S. Cl. .................... 707/103 R; 707/1; 707/2; 707/100; 707/102; 707/103 Z; 717/100

(58) Field of Classification Search ............. None
See application file for complete search history.

(56) References Cited

U.S. PATENT DOCUMENTS

| | | | |
|---|---|---|---|
| 5,295,256 A | 3/1994 | Bapat | 395/500 |
| 5,504,917 A | 4/1996 | Austin | |
| 5,768,586 A | 6/1998 | Zweben et al. | |
| 5,801,687 A | 9/1998 | Peterson et al. | |
| 6,163,776 A | 12/2000 | Periwal | 707/4 |
| 6,292,803 B1* | 9/2001 | Richardson et al. | 707/102 |
| 6,314,559 B1 | 11/2001 | Sollich | |
| 6,425,016 B1 | 7/2002 | Banavar et al. | |
| 6,449,657 B2* | 9/2002 | Stanback et al. | 709/245 |
| 6,477,439 B1 | 11/2002 | Bernaden et al. | |
| 6,701,513 B1 | 3/2004 | Bailey | |
| 6,708,179 B1* | 3/2004 | Arora | 707/102 |
| 6,988,270 B2 | 1/2006 | Banavar et al. | |
| 7,000,190 B2 | 2/2006 | Kudukoli et al. | |
| 7,076,740 B2 | 7/2006 | Santori et al. | |

(Continued)

FOREIGN PATENT DOCUMENTS

CA    2 256 931 A1    6/2000

(Continued)

OTHER PUBLICATIONS

PCT Search Report for PCT/US2005/018942, 13 pages, Aug. 11, 2005.

(Continued)

*Primary Examiner*—Apu Mofiz
*Assistant Examiner*—Kavita Padmanabhan
(74) *Attorney, Agent, or Firm*—Cantor Colburn (57) ABSTRACT

A computer software system is provided, namely an Object Process Graph Relational Database Interface (OPGRDI) system. The OPGRDI defines and updates relational database tables based on an OPG and stores and retrieves data in the tables as an OPG-defined application is run. The OPGRDI also defines and updates OPG persistent data object elements based on relational database table schemas. The OPGRDI functions can be enabled by users who want to store and retrieve application information in a relational database system, such as Oracle, Sybase, SQL Server, etc. The OPGRDI alters relational database tables as a user changes the structure of an OPG-defined application.

20 Claims, 11 Drawing Sheets

U.S. PATENT DOCUMENTS

| | | | |
|---|---|---|---|
| 2001/0018690 A1* | 8/2001 | Tung Ng et al. | 707/103 Y |
| 2002/0184610 A1 | 12/2002 | Cong et al. | |
| 2002/0191155 A1 | 12/2002 | Aldridge et al. | 707/1 |
| 2003/0172091 A1* | 9/2003 | Norcott | 707/203 |
| 2004/0025171 A1 | 2/2004 | Barinov et al. | |
| 2004/0181544 A1* | 9/2004 | Anderson | 707/102 |
| 2005/0273773 A1 | 12/2005 | Gold et al. | |
| 2006/0059461 A1 | 3/2006 | Baker et al. | |

FOREIGN PATENT DOCUMENTS

| | | |
|---|---|---|
| WO | WO 01/25915 A1 | 4/2001 |

OTHER PUBLICATIONS

David J. Anderson; "Using MCV Pattern in Web Interactions;" Internet Article Jul. 23, 2000, pp. 1-22.

C. Russel; "Java Data Objects, JSR 12, Version 1.0.1;" Internet Article May 31, 2003, pp. 1-61.

A. Herbert et al.; "A Graphical Specification System for User-Interface Design;" IEEE Software vol. 7 Jul. 1990 No. 4, 10 pages.

PCT Search Report PCT/US2005/022192 mailed Nov. 11, 2005, 10 pages.

D. J. Anderson; "Using MVC Pattern in Web Interactions;" [online]; [retrieved on Jul. 22, 2000]; retieved from the Internet at http://www.uidesign.net/articles/papers/, 24 pages.

"Struts User's Guide;" [online]; [retrieved on Jul. 25, 2001], 16 pages.

J. Rumbaugh; "State Trees as Structured Finite State Machines for User Interfaces;" Procedings of the ACM Siggraph Symposium on User Interface Software, 1998; pp. 15-29.

Koo, Hsueh-Yung Benjamin, "A Meta-Language for Systems Architecting", Massachusetts Institute Of Technology, Jan. 2005, 168 pgs.

Borland Software Corporation, "User Guide for Together ControlCenter and Together Solo", Updated Mar. 24, 2004. XP-002374484, 657 pages.

Eisenbarth, Thomas, et al. "Static Trace Extraction", Proceedings of the Ninth Working Conference on Reverse Engineering . University of Stuttgart, Germany. IEEE Compute Society. WCRE 2002, 10 pages.

PCT Search Report PCT/US2005/032114. Date of Mailing: Apr. 19, 2006, 13 pages.

Borger, Egon, et al. "Modeling the Meaning of Transitions from and to Concurrent States in UML State Machines", p. 1086-1091, ACM Feb. 3, 2003 1-58113-624, retrieved Aug. 3, 2006.

Knight, Alan, et al. "Objects and the Web", p. 51-59, Mar./Apr. 2002 IEEE, retrieved Aug. 2, 2006. Focus Engineering Software, 07-7459/02.

Liu, Chung-Shyan. "An Object-Based Approach to Protocol Software Implementation", p. 307-316, 1994 ACM, retrieved Aug. 2, 2006. Department of Information and Computer Engineering, Chun Yuan C. University.

Wasserman, Anthony I., et al. "A Graphical, Extensible Integrated Environment for Software Development", p. 131-142, 1986 ACM 0-89791-212-8/86/0012/131, retrieved Aug. 2, 2006. Interactive Development Environments, Inc.

Zhang, Kang. "Design, Construction, and Application of a Generic Visual Language Generation Environment". IEEE, 2001. 0098-5589/01, 19 pages.

Arefi, Farahangiz, et al. "The Object-Oriented Design of a Visual Syntax-Directed Editor Generator". IEEE, 1989. 0730-3157/89/0000/0389. School of Computer Science Florida International University, 8 pages.

Reid G. Smith, et al., Impulse-86 A Substrate for Object-Oriented Interface Design, Sep. 1986 OOPSLA '86 Proceedings, pp. 167-176.

* cited by examiner

OBJECT PROCESS GRAPH RELATIONAL DATABASE INTERFACE

CROSS REFERENCE TO RELATED APPLICATIONS

The present application is related to copending application, U.S. patent application Ser. No. 10/908,654, entitled "Object Process Graph System" filed on May 20, 2005 by inventors David M. Baker, Steven A. Gold, Vladimir Gusev, and Hongping Liang and incorporated herein by reference in its entirety. In addition, the present application claims the benefit of provisional application No. 60/585,257 filed Jul. 2, 2004 which is herein incorporated by reference in its entirety.

BACKGROUND OF THE INVENTION

The present invention generally relates to relational database mapping and interface tools and, in particular, to an object process graph relational database interface. Object Process Graph (OPG) is described subsequently herein.

BACKGROUND

Since the development and acceptance of object-oriented programming technology and associated object-oriented languages like Smalltalk, C++ and Java, a number of systems and subsystems have been developed to provide object persistence. For the most part, these systems and subsystems are either object-oriented databases or interfaces to relational database management systems. Although object-oriented databases typically provide a more efficient, higher performance means of storing and retrieving persistent object data, the market for these products has not grown as fast as the market for other object-oriented technologies. One major reason for the lack of growth is dominance of relational database systems in the database market.

Language and/or database specific relational database interface systems have been developed that provide a way of using relational databases to store and retrieve persistent object data. In the case of Java, the Java Data Object (JDO) standard provides a language standard and a functional standard for the databases. There are a number of such systems available. They provide a way of interfacing Java programs to a relational database system. These interfaces require a static, user-generated mapping between objects and database tables that must be updated as the Java objects are changed.

A means of interfacing Object Process Graphs to relational databases would further broaden the scope, applicability, and usefulness of these computer applications by providing a bridge to relational database technology.

BRIEF DESCRIPTION OF THE INVENTION

The present invention is directed to object process graph relational database interfaces that satisfy these needs.

One aspect is an object process graph relational database interface system including a relational database table definer for creating at least one schema that is storable in a relational database management system corresponding to at least one object process graph.

Another aspect is a software product stored as instructions on a storage medium for performing a method of providing an object process graph relational database interface. At least one schema that is storable in a relational database management system corresponding to at least one object process graph is created. A plurality of descriptions of changes to at least one object process graph is created. The descriptions are grouped by transaction. The descriptions are selectively stored in the relational database management system.

Yet another aspect is a method of providing an object process graph relational database interface. At least one object process graph is received. At least one schema corresponding to the object process graph is created. At least one schema corresponding to the object process graph is provided. The schema associated with the object process graph is stored in a relational database.

The present invention includes many advantages, including enabling application developers, users and domain experts who use Object Process Graphs to continue to use relational database systems to store business information. The present invention provides a way for legacy applications, applications implemented with traditional technologies, to access data produced by OPG-defined applications, and for OPG-defined applications to access data produced by legacy applications.

BRIEF DESCRIPTION OF THE SEVERAL VIEWS OF THE DRAWINGS

These and other features, aspects, and advantages of the present invention will become better understood with regard to the following description, appended claims, and accompanying drawings, where:

DETAILED DESCRIPTION OF THE INVENTION

One aspect of the present invention is a system that includes a Graph Data Object Definer (GDOD) system, a Relational Database Table Definer (RDTD) system, a Graph Data Change Recorder (GDCR) system, a Graph Data Retriever (GDR) system and a Relational Database Updater (RDU) system. Together, these systems provide a comprehensive interface between Object Process Graphs and Relational Database Management Systems.

Another aspect is a method where the RDTD parses and interprets XML descriptions of Object Process Graph (OPG) data structures and produces equivalent relational database table schemas. The GDOD accesses a relational database's table schema and creates an XML description of OPG data elements. As an OPG makes changes to its data elements in response to inputs or processing, the GDCR records descriptions of the changes on a journal file. The change descriptions are grouped and delimited by transaction information. The RDU runs on a separate process thread. The RDU reads the journal file and creates database update transactions from the change descriptions. When an OPG is running an application, it generates requests for persistent OPG data. These requests are processed by GDR.

Traditional software applications can access OPG persistent data via a relational database. The relational database table schema produced by this relational database interface is organized in a traditional RDBMS manner and the names used for tables and columns are derived from names defined by the OPG application developer/user.

The journal file, which is used to store OPG persistent data change descriptions, serves two important purposes. First, it decouples the OPG from relational database update processes. This minimizes negative performance impacts caused by relational database access conflicts. Second, the file is used to provide incremental backup and recovery capability. If the database server fails, the journal file is used to update a recovered database with any missing update transactions. Journal files are maintained for a user-defined period, which is part of the OPG configuration.

Figure 1:
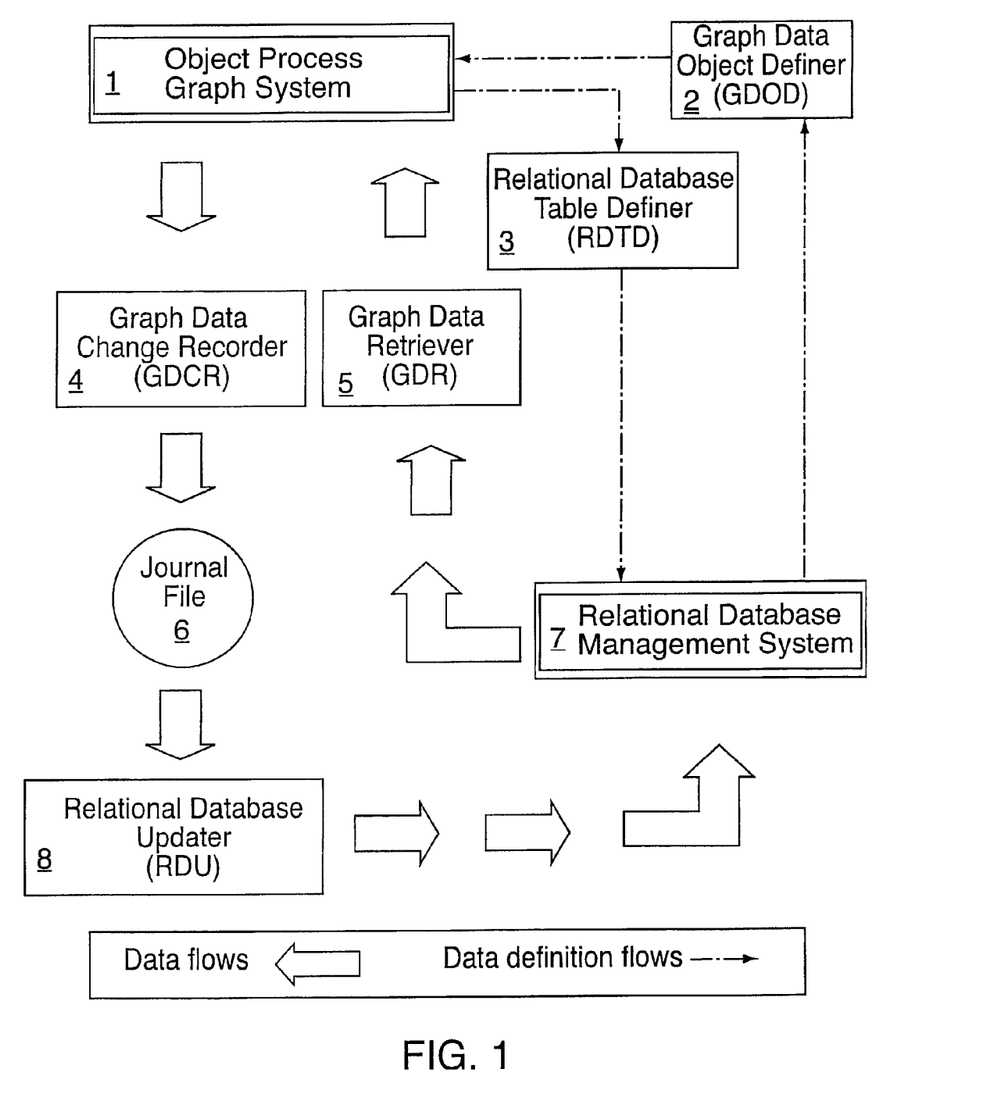
FIG. 1 is a block diagram showing an overview of a system according to embodiments of the present invention.

Embodiments of the present invention includes five components (FIG. 1): a Graph Data Object Definer (GDOD) 2, a Relational Database Table Definer (RDTD) 3, a Graph Data Change Recorder (GDCR) 4, a Graph Data Retriever (GDR) 5, and a Relational Database Updater (RDU) 8. OPG data object descriptions are converted into table schemas in relational database management system (RDMS) 7 and table schemas in RDMS 7 are converted into OPG data object definitions in OPG system 1. Table information in RDMS 7 is updated as OPG data objects are created and updated.

Graph Data Object Definer (GDOD)

In one exemplary embodiment of the present invention, the GDOD 2 (FIG. 2) is implemented as a Java object class and a small group of support classes. It accesses a relational database table schema in the RDMS 7, interprets it, and using the Java Document Object Model (JDOM) 11, it generates an XML description file 12 of OPG data objects that correspond to the database tables. The XML description file 12 of OPG data objects is then loaded by standard XML import functions 13 of the OPG.

Figure 2:
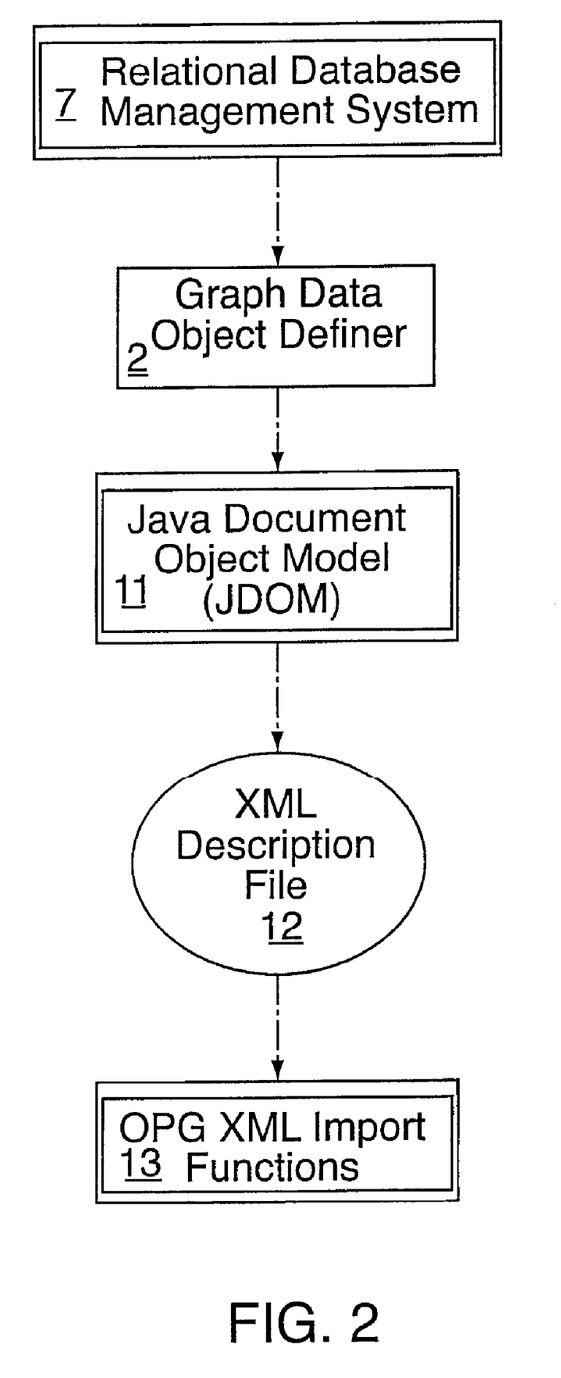
FIG. 2 is a Graph Data Object Definer according to embodiments of the present invention.

Tables in RDMS 7 correspond to (map to) CompositeData nodes in an OPG and the columns in a table in the RDMS 7 correspond to PrimitiveData nodes. Each CompositeData node has an instance number attribute that represents its ID.

Figure 3:
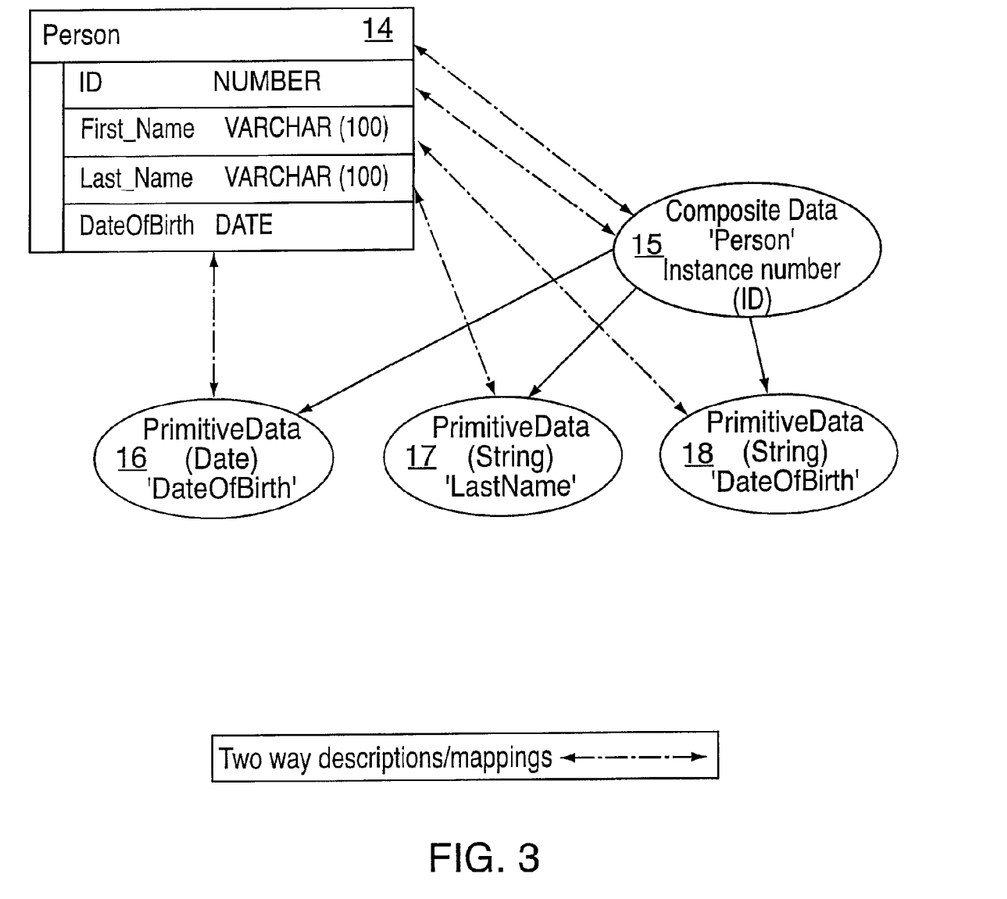
FIG. 3 is an Example of Relational Database Table to OPG Data Node Mapping according to embodiments of the present invention.

An example mapping is shown in FIG. 3 according to embodiments of the present invention. (Note that description/ mappings are show in this and subsequent drawings as two-way dashed lines) The 'Person' table 14 is mapped to a CompositeData node 15 with the name 'Person'. Each of the columns in the 'Person' table, i.e. FirstName, MiddleName, LastName and 'DateOfBirth, is mapped to PrimitiveData nodes 16 18 with the same names as the columns. The 'Id' column of the database table is mapped to an instance number attribute in the CompositeData node. In some cases, the primary key mapping requires transformations to produce unique instance numbers.

Figure 4:
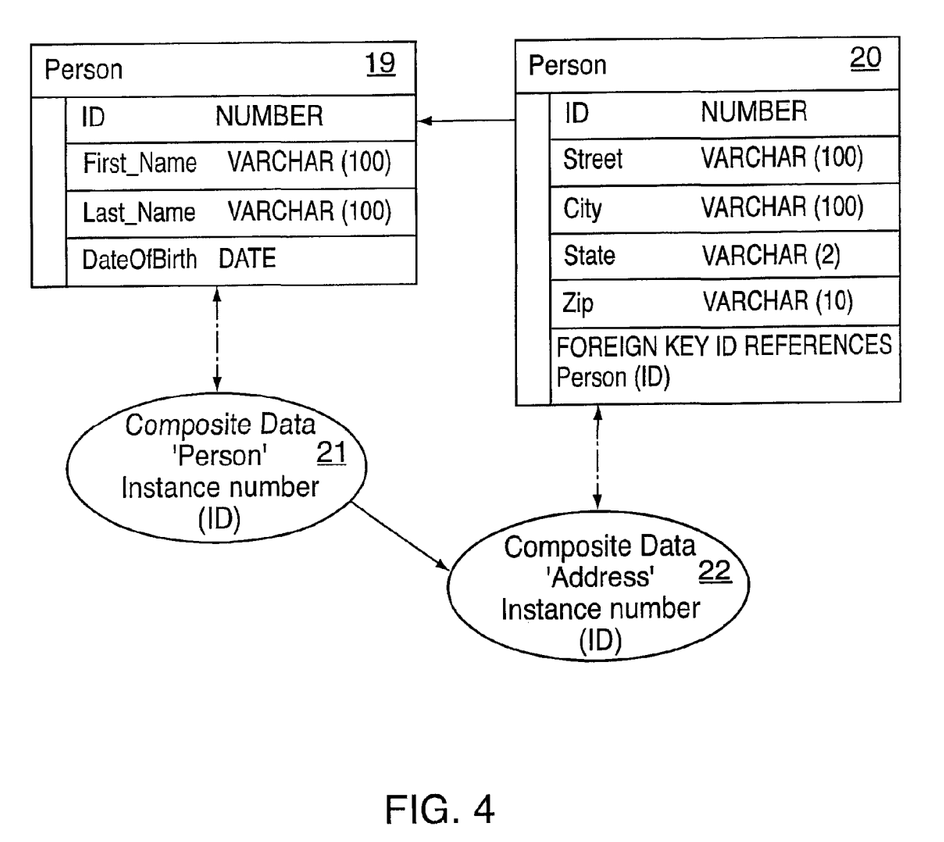
FIG. 4 is an Example Mapping of a One-to-One Relationship Between Two Relational Database Tables and Two CompositeData Nodes according to embodiments of the present invention.

When a one-to-one relationship exists between two tables, i.e. the primary key of a table is also a foreign key reference to another table, the relationship is mapped as shown in FIG. 4 according to embodiments of the present invention. The CompositeData 22 node representing the 'Address' table 20 is a child of the CompositeData node 21 representing the 'Person' table 19.

Figure 5:
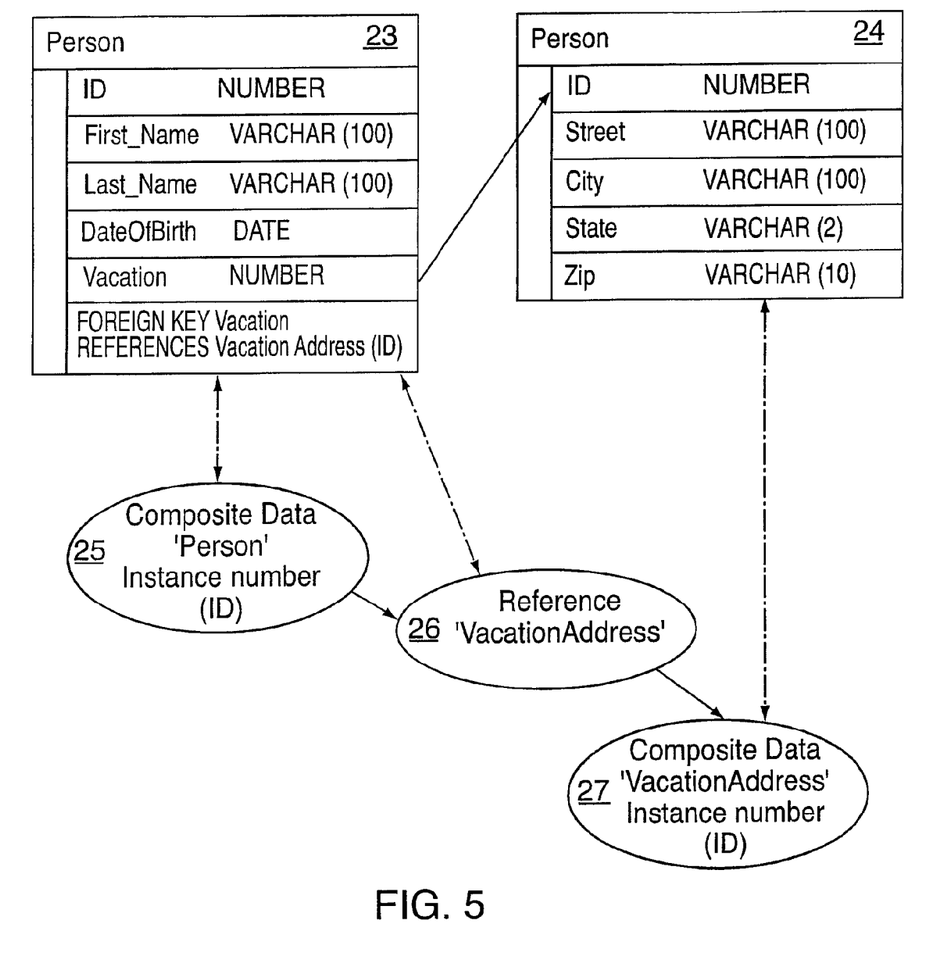
FIG. 5 is an Example Mapping of a One-to-One or One-to-Zero Relationship Between Two Relational Database Tables and Two CompositeData Nodes according to embodiments of the present invention.

When a one-to-one or one-to-zero relationship exists between two tables, i.e. the referencing table has a foreign key column that references another table, the relationship is mapped as shown in FIG. 5. The CompositeData 25 node corresponding to the Person table 23 has a Reference node 26 as an attribute, and it in turn has the CompositeData node 27 representing the "VacationAddress" relational database table 24 of the same name.

Figure 6:
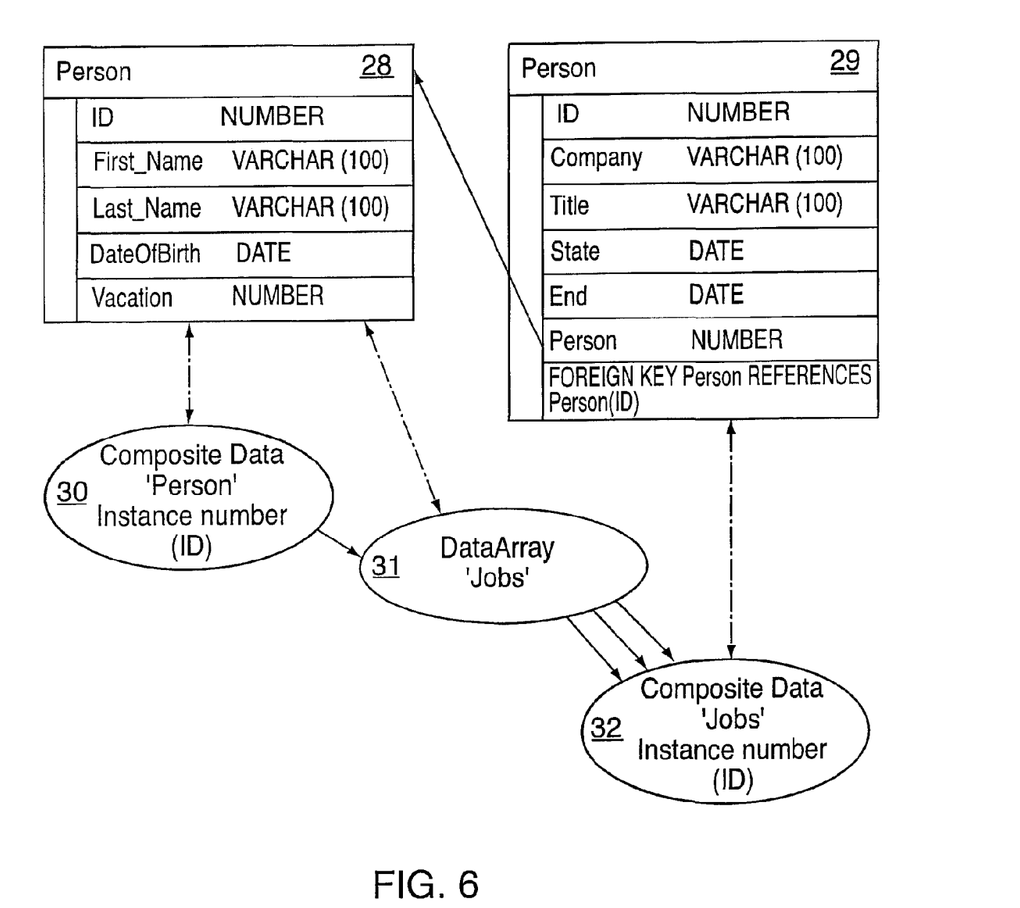
FIG. 6 is an Example Mapping of a One-to-Many Relationship Between Two Relational Database Tables and Two CompositeData Nodes according to embodiments of the present invention.

When a one-to-many relationship exists between two tables, i.e. the referenced table (many side of the relationship) contains a foreign key column that references the referencing table, the relationship is mapped as shown in FIG. 6 according to embodiments of the present invention. In this situation, the foreign key reference cannot be null. The CompositeData node 30 corresponding to the 'Person' table 28 has a DataArray node 31 as an attribute. The DataArray node has an array of CompositeData nodes 32 that correspond to rows in the 'Jobs' table 29.

Figure 7:
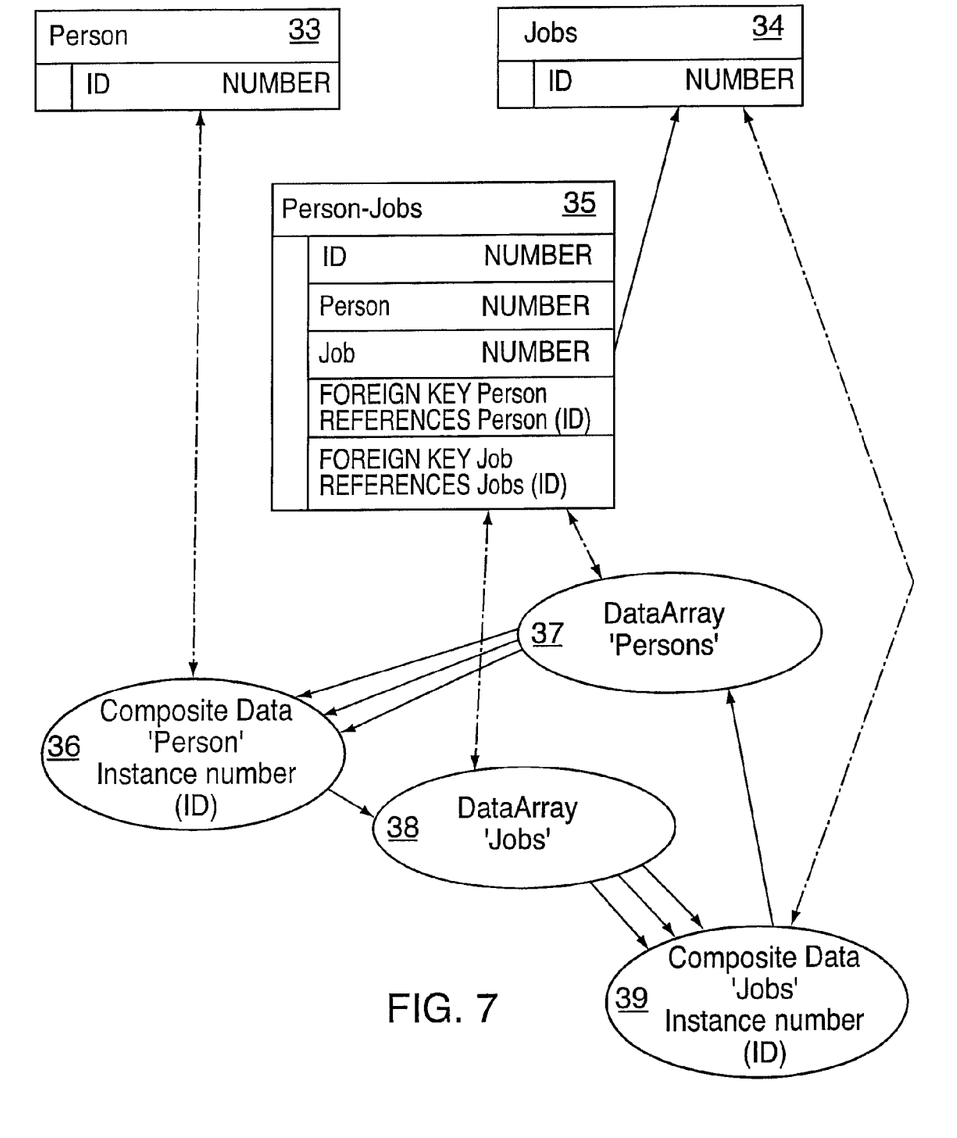
FIG. 7 is an Example Mapping of a Many-to-Many Relationship Between Two Relational Database Tables and Two CompositeData Nodes according to embodiments of the present invention.

When a many-to-many relationship exists between two tables, i.e. there is a connecting table between the two tables that holds references to the related tables, the relationship is mapped as shown in FIG. 7 according to embodiments of the present invention. Each row in the connecting table represents one relationship between rows in the two tables. This mapping simply adds an inverse of the one-to-many relationship described above to the original one-to-many mapping. Note that each link in the connecting table 35 corresponds to elements in DataArrayNodes 37 and 38.

Relational Database Table Definer (RDTD)

In one embodiment of this invention (FIG. 8), the RDTD 3 is implemented as a Java class and a small set of support classes. It interprets an XML description file 12 of an OPG's data objects and then produces and executes Structured Query Language (SQL) statements that create a table schema in an RDMS 7. The resulting table schema is equivalent to the OPG. The XML description of an OPG's data objects is produced by standard OPG export functions 40. In the interpretation phase, the XML description file 12 is loaded into a java Document Model (ODOM) 11, which makes the node descriptions readily accessible to the RDTD 3. The interpretation of the XML description file 12 and the creation of a database table schema in an RDMS7 is the inverse of the process described above for creating OPG data objects from a schema in an RDMS 7.

The mappings depicted in FIG. 3 show an example of how the SQL statements produced by the RDTD 3 define a relational table 14 for each CompositeData node 15 in the OPG. They also create a column definition for each PrimitiveData node attribute of a CompositeData node 16-18.

The mappings depicted in FIG. 4 show a CompositeData node 21 that has a CompositeData node 22 as an attribute mapped to two relational database tables 1 9 and 20. The relationship is one-to-one, i.e. either both of them exist or neither exists.

The mappings depicted in FIG. 5 show a CompositeData node 25 that has a reference to a CompositeData node 27 through a Reference node mapped to two relational database tables 23 and 24. The relationship is one-to-one or one-to-zero, i.e. the referenced node 5 may or may not be present.

The mappings depicted in FIG. 6 show a CompositeData node 30 that has a DataArray node 31 as an attribute. The DataArray node has an array attribute of CompositeData nodes 32. This is a one-to-many relationship, i.e. a CompositeData node 30 has an association with many CompositeData nodes 32.

The mappings depicted in FIG. 7 shows a CompositeData node 36 that has many CompositeData nodes 39 as attributes and a CompositeData node 39 that has many CompositeData nodes 36 as an attribute.

Graph Data Change Recorder (GDCR)

In one embodiment of this invention (FIG. 9), a GDCR 4 is created when the OPG system 1 is initialized if the option to record persistent graph data in an RDMB 7 has been selected by a user.

Figure 9:
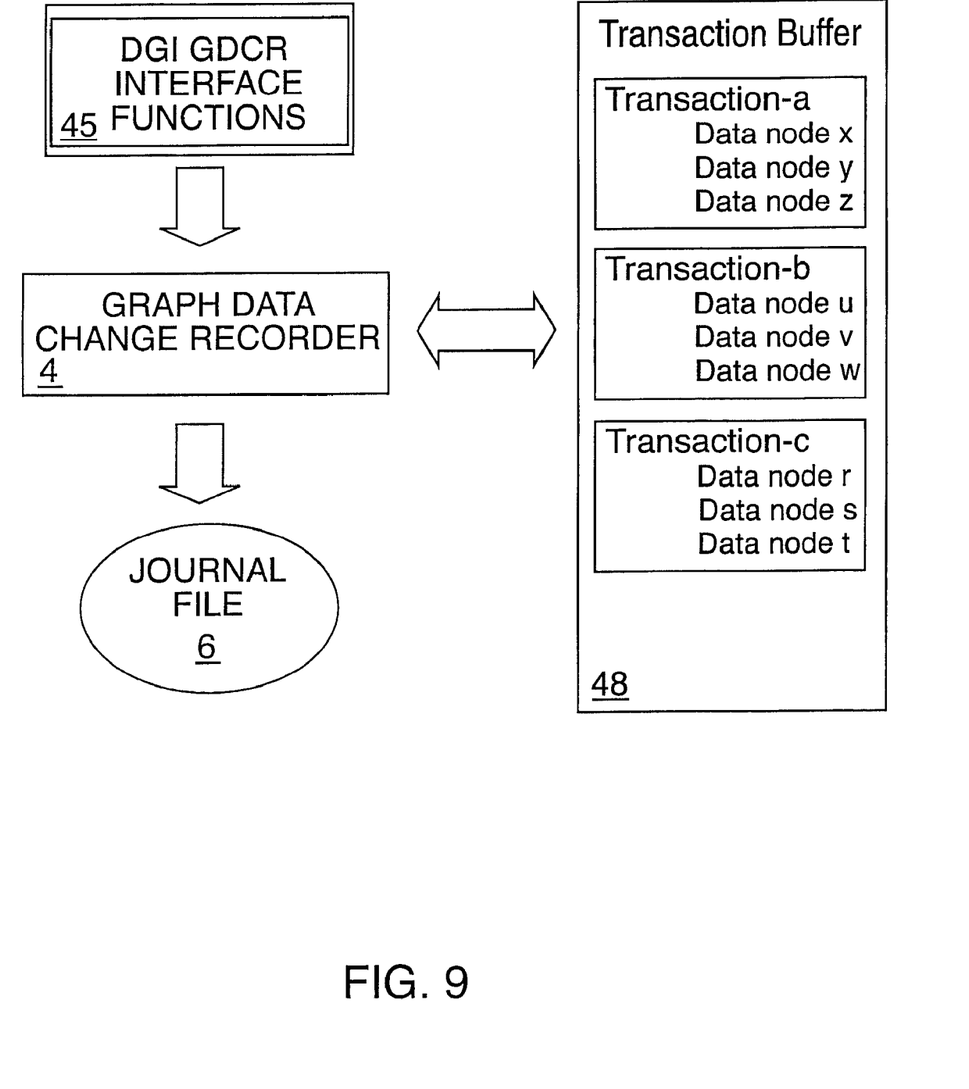
FIG. 9 is a Graph Data Change Recorder (GDCR) according to embodiments of the present invention.

As OPG data nodes are changed, they are sent to the GDCR 4 by the DGI 45 for recording on the Journal file 6. The GDCR 4 groups data node changes by their transaction in a temporary transaction buffer 48. Transactions are user session oriented, i.e. the changes made to OPG data nodes during a user interaction are grouped into a transaction. Multiple users may interact with the OPG system 1, so the GDCR 4 gathers data node changes for more than one transaction simultaneously. When a transaction is complete, i.e. a user has finished making changes, the DGI 45 sends a signal to the GDCR 4 indicating that a transaction has been completed.

When a transaction is completed, the GDCR 4 removes the transaction's changed data nodes from the transaction buffer and creates descriptions of the node changes and stores them on the Journal file 6. It generates a transaction number for each transaction and stores them on the Journal file 6 and records the last number in OPG's persistent storage.

When the Journal file 6 size reaches a user-defined limit, the GDCR 4 closes the current file and opens a new one. Journal files 6 serve as a backup media for an RDMS 7. When an RDMS 7 is backed up as part of a routine management procedure, all but the current journal file 6 can be purged.

Relational Database Updater (RDU)

In one embodiment of this invention (FIG. 10), the RDU 8 is implemented as a stand-alone Java program that runs on its own separate thread. It reads OPG data node update descriptions from a journal file 6 and records them in an RDMS 7 (OPG data node update descriptions are written to the Journal file 6 by the GDCR 4 as described above).

Figure 10:
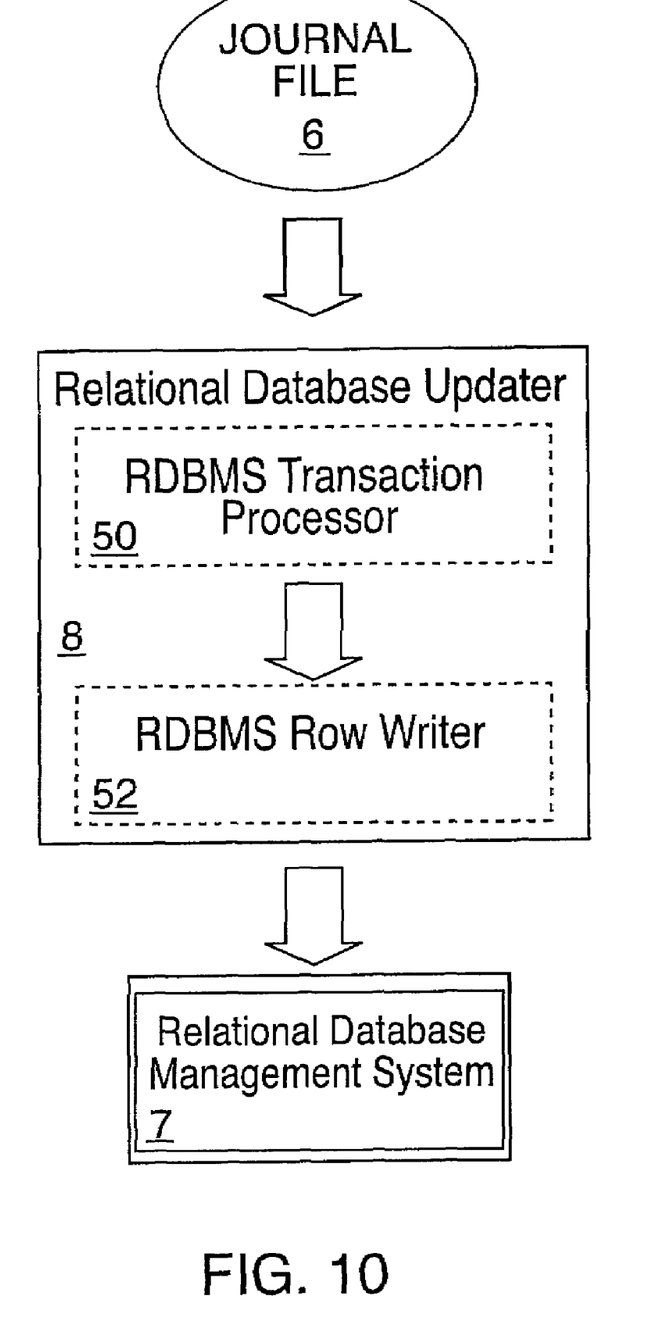
FIG. 10 is a Relational Database Updater (RD) according to embodiments of the present invention.

The RDU 8 thread is started during OPG system 1 initialization if the option to record persistent graph data in an RDMS 7 has been selected by a user. The RDU 8 startup occurs immediately after the GDCR 4 is initialized. The RDU 8 records the number of the last transaction recorded in the RDMS 7. During initialization, it examines the Journal files 6 that exist and will determine if there are any transactions on the Journal files 6 that have not been recorded in the RDMS 7. It then records any transactions that were not recorded. This recovers any transactions that may have been lost due to RDMS 7 failure.

When the OPG system 1 is fully initialized, the RDU 8 periodically polls the Journal file 6 to determine if it has any new unrecorded information. When it finds that new information has been added to the Journal file 6, it will process all new transactions until there are no more and then resumes polling.

The RDU 8 includes two major components, an RDBMS Transaction Processor (RTP) 50 and an RDBMS Row Writer (RRW) 52. The RTP 50 reads complete transactions from the Journal file 6. Transactions composed of PrimitiveData node change descriptions specify: the names of CompositeData nodes, which corresponds to relational database table names; the names of PrimitiveData nodes, which correspond to relational database table column names; primary key values for the rows; and values for the columns. Typically, a transaction includes updates to many tables. The RTP 50 sorts the descriptions by table and primary key values. It then determines the order in which to do the updates in order to maintain referential integrity within the RDMS 7. The RTP 50 initializes an RRW 52 for each table to be updated. The list of rows to be updated in a particular table is then passed to the associated RRW 52. The RRW 52 reads the metadata in the RDMS 7 for its associated table to obtain data type conversion information. Then it creates prepared statements for updating and inserting row information as required. Based on the row information received from the RTP 50, the RRW 52 reads each row based on primary keys to determine if the row is being updated or inserted. It then inserts and/or updates the rows as specified by the RTP 52.

Graph Data Retriever (GDR)

In one embodiment of this invention (FIG. 11), the GDR 5 is implemented as a Java class and a group of support classes. It retrieves OPG CompositeData node attribute values from an RDMS 7. OPG/DGI Data retrieval functions 54 make requests of the GDR 5 by providing CompositeData nodes into which data is to be loaded.

Figure 11:
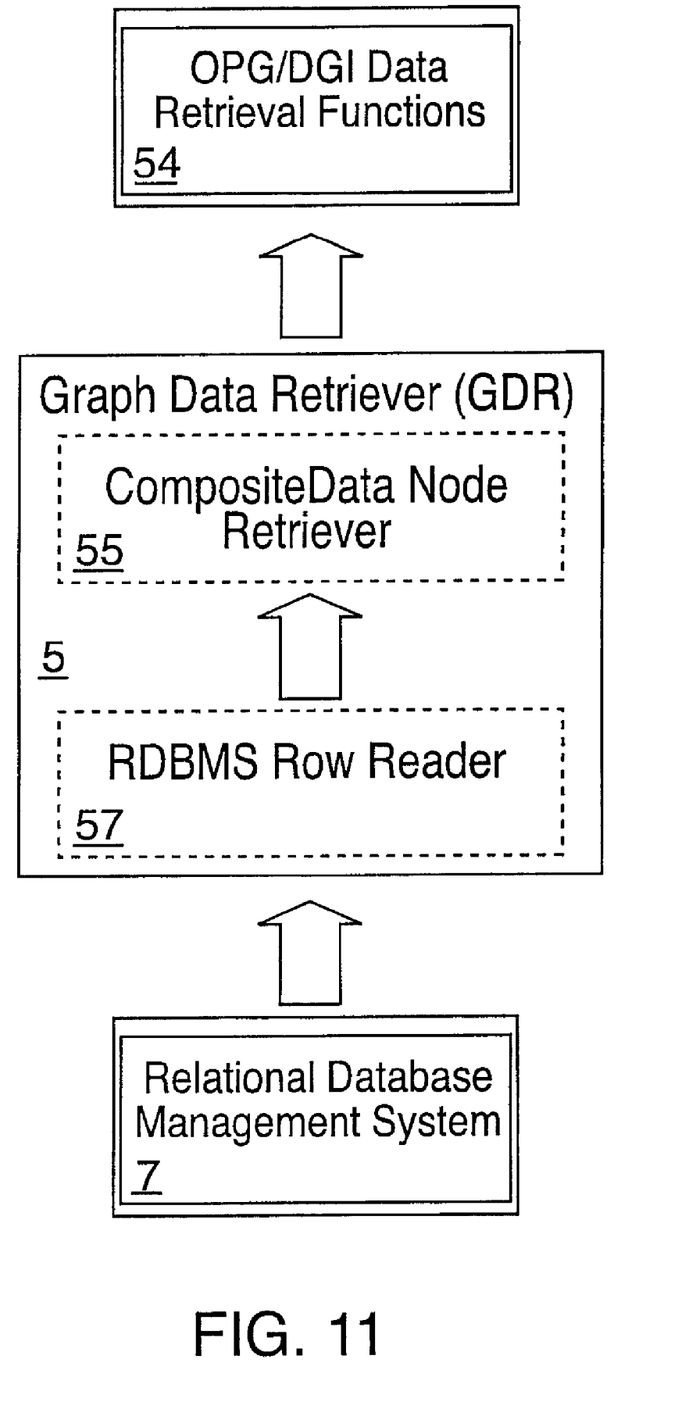
FIG. 11 is a Graph Data Retriever (GDR) according to embodiments of the present invention.

The GDR 5 is initialized when the OPG system 1 is started if the option to record persistent graph data in an RDMS 7 has been selected by a user.

The GDR 5 includes two major components, a CompositeData Node Retriever (CNR) 55 and an RDBMS Row Reader (RRR) 57. It is capable of handling multiple requests to retrieve data for CompositeData nodes concurrently. The CompositeData nodes into which data is to be loaded are parent nodes of complete object graphs. These graphs include PrimitiveData, Reference, CompositeData, and Array nodes. These nodes have their actual names and the PrimitiveData nodes have default or null values that act as placeholders. The names of CompositeData nodes correspond to relational table names, and the names of PrimitiveData nodes correspond to relational table column names as described above. The nodes also contain identity values that are used to construct primary keys for retrieval from the RDMS 7.

When a request for data is received, the GDR 5 creates a new instance of the CNR 55 to process the request. The CNR 55 runs on the requestor's thread, which is running a user session. The CNR 55 receives the parent CompositeData node as a parameter. It recursively processes the request by following the CompositeData node's object graph structure. It initializes an instance of the RRR 57 for each CompositeData node found in the graph, which retrieve data for the PrimitveData node attributes of their respective CompositeData node. RRR 57 instances are held in a cache so they can be reused.

The RRR 57 accesses the metadata in the RDMS 7 to get data type conversion information and when data is retrieved converts the data to OPG data types and stores it in the PrimitiveData nodes.

Object Process Graph Relational Database Interface Method and an Embodiment

Following is a description of an exemplary method of creating an Object Process Graph Relational Database Interface (OPGRDI) system, which was defined and described above. Included is one embodiment of this method.

1.) Assuming the existence of an embodiment of an Object Process Graph System with which an embodiment of an OPGRDI is to be used, choose an initial set of hardware/operating system platforms, programming frameworks, database and/or file systems and display mediums upon which to build and run the OPGRDI system which is the same as or completely compatible with that used to build the OPG system 1 embodiment. In one embodiment, the Linux operating system, running on Intel based server hardware over an Intranet, connected to Intel based PC's running Microsoft Windows XP software was used. The Java programming language from Sun Microsystems was used to program the OPGRDI system. Finally, the Oracle RDBMS from Oracle, Inc. was used. This embodiment may run, with no programming changes, on either the Tomcat application server running locally under the Window XP operating system or on a remote Linux server running Tomcat. Similarly, the Oracle RDBMS may be run locally or remotely. The Eclipse development platform from the Eclipse Foundation along with the MyEclipse plug-in from Genuitec was used to do the Java software development. Note that the above operating systems, application platforms and programming languages tools represent just one possible configuration of development and operational systems that can be used to create and run the invention.

Figure 8:
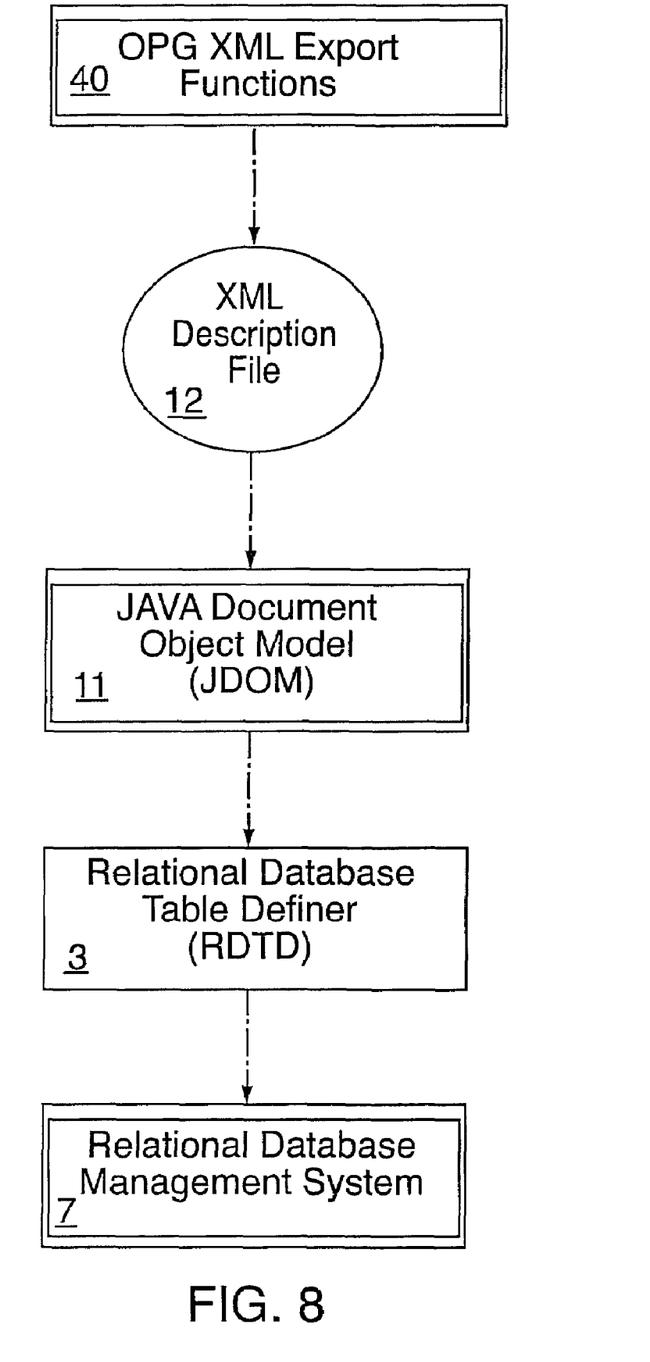
FIG. 8 is a Relational Database Table Definer according to embodiments of the present invention.

2.) Using the summary and description of the invention above, along with the accompanying FIGS. 1-11, define a set of classes and an appropriate class hierarchy that will encompass the functionality required. The design patterns described in "Design Patterns" by Gamma et al, Addison Wesley 1995 and "Patterns in Java" by Grand, Wiley Computer Publishing 1998 may be useful in creating a set of classes with the needed functionality. A high level CASE tool for the definition of these classes may also be used. Some classes that could be defined are:

a. A class to interpret metadata in an RDMS 7 and produce an XML description of corresponding OPG data nodes (FIG. 2). The Java Document Model (ODOM) 11 and an XML parser can be used to generate an XML file. The class definitions of OPG data nodes are essential information for constructing the class. Also, a thorough understanding of the system tables in the RDMS 7, Oracle in this proposed embodiment, is necessary to understand the metadata in the RDMS 7.

b. A class to interpret an XML description of OPG data node structures and generate and execute Structured Query Language (SQL) statements to create a corresponding table schema in the RDMS 7 (FIG. 8). As with the above class development, JDOM 11 and knowledge of the OPG data nodes and Oracle would be helpful.

c. A class to process graph data changes and write descriptions of them to a Journal File 6 (FIG. 9)

d. A stand-alone program that can read and interpret graph data changes and generate and execute SQL statements to store data in an RDMS 7 (FIG. 10).

e. A class that accepts requests to load data to a CompositeData node graph of data nodes and retrieves the data from an RDMS 7 (FIG. 11).

The above program and classes should include both inner classes and some first class objects to provide specific functionality. None of these classes are persistent.

Object Process Graph Description

Object Process Graph (OPG) is the definition component of the Object Process Graph System (OPGS), a complete application development and execution environment. Other components include a Dynamic Graph Interpreter (DGI) that interprets or executes applications defined by OPGs and a graphical user interface for creating and modifying OPGs.

Embodiments of the OPG may be considered a computer language (it is Turing complete) that is interpreted as the program is executed. An OPG is stored in transient and persistent computer memory. An OPG can hold any data structure, which includes, but is not limited to: relational tables, hierarchical tables, n-dimensional data arrays, spreadsheets, graphical models and 3-D physical models. These data structures are not stored as blobs, which is common in relational database systems, but in special OPG structures that reflect their original structure and internal relationships. OPG process and control structures provide control over the order and timing of persistent and transient data validation, transformation and display within an application. OPG structures can also define mathematical formulas, regular expressions (in the case of textual data or mixed quantitative and textual data) and complete algorithms.

An application's OPG can be rendered on a computer terminal or static output medium, e.g. paper. OPG data, process and control structures displayed on an interactive medium can be edited. Unlike traditional software development systems, editing an application's OPG does not generate code that must be compiled and installed. Instead, changes are made and take affect immediately. Changes can even be made while the DGI is interpreting (running the application). The ability to safely change an application at any time is desired for rapid development and the long-term maintenance of large, complex enterprise-wide application systems.

All application execution state information in an OPG is held in Application State objects. The DGI acts on the OPG by changing the application state information it holds. Application state information can include any persistent data object. A DGI may operate on multiple application states concurrently, merging or splitting state information between combinations of application state objects.

An OPG maintains audit trail information for all persistent and transient data changes in an application—at the primitive data level. Audit trail information is readily available for display on a user interface, via display controls or for further update and manipulation in an application's process and data flows.

Audit information defining changes made in long and short transactions is maintained and tracked for all changes to the persistent data of an application. Long transactions enable the system to organize, control and track changes to all persistent data. Such changes can take place over an extended period of time (days or weeks) over many work sessions. Short transactions, on the other hand, are made during a single user session or interaction with the system. Long and short transaction information is immediately available for manipulation and display within the application, via a system's graphical user interfaces. Tracking long transactions also facilitates rollbacks to any point in a transaction and deletions of a transaction (with audit trails) are automatically available via the application interface. Control of access to all functionality and data within the application by users is available through the system interface. This includes separate access rights (read, write, rollback) for each primitive data item defined as part of an application for each user.

In addition to data entered or changed via a user interface, an embodiment of the system also accepts input data to application processes in any digital format from other systems.

Some embodiments include a graphical user interface. A graphical user interface can enable a user to specify the format of all input that is then automatically parsed and used to update an application—adding to or modifying persistent data in the database or transient data in the application or display interfaces—at any point in the application process.

Output data may likewise be created in any format from any point in an application (for persistent or transient data), using the inverse of the above process in various embodiments. In some embodiments, external databases, such as relational databases, may be registered with an application, and all persistent data within the application may be stored in or retrieved from such databases.

Embodiments of the Object Process Graph component of the present invention extend the basic functionality of graph object-oriented databases. Embodiments of the present invention synthesize the functionality of dynamic process elements and graph object oriented databases into a single integrated system, which makes it possible to rapidly create complete, complex enterprise wide applications without a traditional programming language. An OPG is directly and dynamically interpreted, therefore no code generation is required. The ease of changing an OPG and the immediate feedback resulting from changes greatly simplifies maintaining and changing OPG based applications.

Although the present invention has been described in considerable detail with reference to certain embodiments, other embodiments are possible. For example, different operating systems, programming languages, and software architectures may be used to practice embodiments of the present invention. Therefore, the spirit and scope of the appended claims should not be limited to the description of the embodiments contained herein.

As described above, the embodiments of the invention may be embodied in the form of hardware, software, firmware, or any processes and/or apparatuses for practicing the embodiments. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer implemented object process graph relational database interface system, comprising:
    a computing device interfaced to a storage medium and a display medium;
    a relational database table definer for creating a database schema that is stored in a relational database management system, said database schema corresponding to an object process graph in an object process graph system for creating and executing application programs, thereby providing a mapping between said object process graph in said object process graph system and said database schema in said relational database management system, wherein said object process graph system comprises:
        said object process graph for defining an application, said object process graph including process and control structures for control over an order and a timing of data validation, transformation and display, said object process graph being dynamic, directed and cyclical, and said object process graph including at least one data node, at least one process node, and at least one application state node; and
        an interpreter for interpreting said object process graph to execute said application, said object process graph capable of being changed while being interpreted by said interpreter.

2. The system of claim 1, further comprising:
    a graph data change recorder for creating a plurality of data instance change descriptions that correspond to changes to instance data of said object process graph, said data instance change descriptions being grouped by transaction;
    at least one journal for holding said data instance change descriptions; and
    a relational database updater for selectively storing said instance data in said database schema in said relational database management system, said relational database updater having a transaction processor and a row writer, said transaction processor for determining which data instance change descriptions are in a particular transaction and determining an order for said selective storing, said row writer for determining whether a new row of instance data is to be inserted or whether an existing row of instance data is to be updated in a particular table in said database schema.

3. The system of claim 2, wherein said relational database updater is capable of running on a separate process thread than the interpreter.

4. The system of claim 1, further comprising:
    a graph data retriever for retrieving composite data node attribute values from said database schema and for providing composite data nodes for data loading into the object process graph.

5. The system of claim 4, wherein said graph data retriever is capable of creating an instance of a composite data node retriever, said composite data node retriever running on a requestor's thread, said composite data node retriever being capable of handling multiple requests for composite data nodes concurrently, said graph data retriever including a row reader for accessing said relational database management system.

6. The system of claim 1, further comprising:
    a graph data object definer for creating a set of data node descriptions for importing into the object process graph system.

7. The system of claim 6, wherein said set of data node descriptions includes a plurality of tables,
- each table corresponding to a composite data node in said object process graph,
- said composite data node having an instance number attribute representing an identifier, and
- said table including columns, each column corresponding to a primitive data node in said object process graph.

8. The system of claim 7, wherein said plurality of tables includes a first table and a second table,
- said first table being in a one-to-one relationship to said second table,
- said first table corresponding to a first composite data node and said second table corresponding to a second composite data node, and
- said first composite data node being in a parent-child relationship to said second composite data node.

9. The system of claim 7, wherein said plurality of tables includes a first table and a second table,
- said first table having a foreign key column that references said second table,
- said first table corresponding to a first composite data node and said second table corresponding to a second composite data node, and
- said first composite data node having a reference node, said reference node being associated with said second composite data node.

10. The system of claim 7, wherein said plurality of tables includes a first table and a second table,
- said first table being in a one-to-many relationship with said second table,
- said first table corresponding to a first composite data node,
- said first composite data node having a data array node, and
- said data array node having an array of second composite data nodes corresponding to said second table.

11. The system of claim 7, wherein said plurality of tables includes a first table, a second table, and a third table,
- said first table being in a many-to-many relationship with said third table,
- said second table connecting said first and third tables,
- said first table corresponding to an array of first composite data nodes,
- said first composite data nodes in the array being associated with a first data array node,
- said first data array node having an array of third composite data nodes corresponding to said third table,
- said array of third composite data nodes being associated with a second data array node, and
- said second data array node being associated with said array of first composite data nodes.

12. A software product stored as instructions on a computer executable storage medium for performing a method of providing an object process graph relational database interface to an object process graph system, said object process graph system creating and executing application programs, the method comprising:
- creating at least one database schema that is storable in a relational database management system, said at least one database schema corresponding to an object process graph, wherein said object process graph includes process and control structures for control over an order and a timing of data validation, transformation and display, and further includes at least one data node, at least one process node, and at least one application state node, said object process graph defining an application executable by an interpreter that interprets said object process graph and allows said object process graph to be changed during said interpreting;
- receiving one or more data instance change descriptions that correspond to changes to instance data of said object process graph, said descriptions being grouped by transaction; and
- selectively storing said instance data in said relational database management system.

13. The software product of claim 12, wherein the method further comprises:
- creating a set of data node descriptions for the object process graph; and
- importing the set of data node descriptions into the object process graph system.

14. The software product of claim 13, wherein said set of data node descriptions includes a plurality of tables,
- each table corresponding to a composite data node in said object process graph,
- said composite data node having an instance number attribute representing an identifier, and
- said table including columns, each column corresponding to a primitive data node in said object process graph.

15. The software product of claim 14, wherein said plurality of tables includes a first table and a second table,
- said first table being in a one-to-one relationship to said second table,
- said first table corresponding to a first composite data node and said second table corresponding to a second composite data node, and
- said first composite data node being in a parent-child relationship to said second composite data node.

16. The software product of claim 14, wherein said plurality of tables includes a first table and a second table,
- said first table having a foreign key column that references said second table,
- said first table corresponding to a first composite data node and said second table corresponding to a second composite data node, and
- said first composite data node having a reference node, said reference node being associated with said second composite data node.

17. The software product of claim 14, wherein said plurality of tables includes a first table and a second table,
- said first table being in a one-to-many relationship with said second table,
- said first table corresponding to a first composite data node,
- said first composite data node having a data array node, and
- said data array node having an array of second composite data nodes corresponding to said second table.

18. The software product of claim 14, wherein said plurality of tables includes a first table, a second table, and a third table,
- said first table being in a many-to-many relationship with said third table,
- said second table connecting said first and third tables,
- said first table corresponding to an array of first composite data nodes,
- said first composite data nodes in the array being associated with a first data array node,
- said first data array node having an array of third composite data nodes corresponding to said third table,
- said array of third composite data nodes being associated with a second data array node, and
- said second data array node being associated with said array of first composite data nodes.

19. A method of providing an object process graph relational database interface to an object process graph system, said object process graph system creating and executing application programs, the method comprising:

receiving at least one object process graph from said object process graph system, said at least one object process graph including process and control structures for control over an order and a timing of data validation, transformation and display, said at least one object process graph being dynamic, directed and cyclical, and each said at least one object process graph including at least one data node, at least one process node, and at least one application state node, said at least one object process graph being executable by an interpreter that interprets said at least one object process graph and allows said at least one object process graph to be changed during the interpreting;

creating at least one database schema corresponding to said at least one object process graph; and storing said at least one database schema associated with said at least one object process graph in a relational database.

20. The method of claim 19, further comprising:

creating at least one description corresponding to said at least one database schema; and importing said at least one description.

* * * * *